United States Patent [19]

Blum et al.

[11] Patent Number: 5,467,452
[45] Date of Patent: Nov. 14, 1995

[54] ROUTING CONTROL INFORMATION VIA A BUS SELECTIVELY CONTROLS WHETHER DATA SHOULD BE ROUTED THROUGH A SWITCH OR A BUS ACCORDING TO NUMBER OF DESTINATION PROCESSORS

[75] Inventors: Arnold Blum, Gechingen; Gottfried Goldrian, Boeblingen; Wolfgang Kumpf, Holzgerlingen, all of Germany

[73] Assignee: International Business Machines Corporation, Armonk, N.Y.

[21] Appl. No.: 91,706

[22] Filed: Jul. 14, 1993

[30] Foreign Application Priority Data

Jul. 17, 1992 [EP] European Pat. Off. ............... 4223600

[51] Int. Cl.⁶ ............................. K06F 13/12; K06F 13/14
[52] U.S. Cl. ............. 395/200.12; 364/131; 364/232.91; 364/240.7; 364/DIG. 1; 364/940.2; 364/940.68; 364/949.91
[58] Field of Search ................................ 370/88, 61, 54, 370/58.2, 58.3, 60; 395/325, 200, 800, 725; 364/131

[56] References Cited

U.S. PATENT DOCUMENTS

| | | | |
|---|---|---|---|
| 4,731,784 | 3/1988 | Keller et al. | 370/88 |
| 4,975,834 | 12/1990 | Xu et al. | 395/800 |
| 5,056,000 | 10/1991 | Chang | 395/325 |
| 5,237,566 | 8/1993 | Brand et al. | 370/61 |
| 5,237,658 | 8/1993 | Walker et al. | 395/200 |
| 5,239,654 | 8/1993 | Ing-Simmons et al. | 395/800 |
| 5,367,643 | 11/1994 | Chang et al. | 395/325 |

FOREIGN PATENT DOCUMENTS

| | | |
|---|---|---|
| 0366935 | 9/1990 | European Pat. Off. . |
| 0493934 | 12/1991 | European Pat. Off. . |
| 3137627 | 10/1984 | Germany . |
| 8909967 | 10/1989 | WIPO . |

*Primary Examiner*—Thomas C. Lee
*Assistant Examiner*—Le Hien Luu
*Attorney, Agent, or Firm*—Arthur J. Samodovitz

[57] ABSTRACT

The invention concerns the transfer of data information in a multiprocessor computer system. If data information has to be transferred between two processor units then the associated control information is made available on a connection bus and the data information is transferred afterwards via a switch unit from the first to the second processor unit. If however data information is to be transferred from a sending processor unit to all other processor units (broadcast transfer) then not only is control information transferred via the connection bus but subsequent data information too; a transfer of data information via the switch unit does not occur in this case. In this manner it is possible to reduce the outlay for the switch unit in terms of circuitry and programming.

4 Claims, 1 Drawing Sheet

ROUTING CONTROL INFORMATION VIA A BUS SELECTIVELY CONTROLS WHETHER DATA SHOULD BE ROUTED THROUGH A SWITCH OR A BUS ACCORDING TO NUMBER OF DESTINATION PROCESSORS

BACKGROUND OF THE INVENTION

The invention relates generally to computer systems having multiple processor units, and deals more particularly with a manner of communicating between the multiple processor units.

A computer system was previously known which included multiple processors units. Each of the processor units is connected to a respective gate circuit, and each gate circuit is connected to a common switch unit and a common connection bus. A common control unit is interposed between the bus and the common switch unit to control the switch. The gate circuit comprises known circuits for transferring information. The switch unit may be in the form of known network switches or matrix switches. The connection bus comprises a number of parallel lines in known manner.

To transfer data information from a first processor unit to a second processor unit, it is firstly essential that the first processor unit sends control information with the aid of which the connection between the first and the second processor unit is produced. For this purpose the first processor unit sends the control information via the respective gate circuit and the connection bus to the control unit, which produces the required connection in the switch unit between the first and second processor units. The data information to be transmitted is then sent from the first processor unit via the switch unit to the second processor unit avoiding the connection bus. This is efficient for communication between any two ot he processor units.

However, it is frequently necessary to transfer data information from a first processor unit to all other processor units. For this purpose the switch unit of the prior art computer system must be able to simultaneously connect the first processor unit to all other processor units which necessitates great outlay in terms of circuitry as well as the program.

The object of the present invention is to provide an interprocessor communication coupler which is simpler than the prior art for coupling communication between one processor and another processor and between one processor and two or more other processors.

SUMMARY OF THE INVENTION

The invention resides in a multiprocessor computer system comprising a bus, at least three processors coupled to the bus, a switch coupled to all of the processors to selectively interconnect any two of the processors at a time, and a control, coupled between the switch and the bus. The control is responsive to control information requesting communication between two processors, for controlling the switch to interconnect the two processors. The system further comprises means for routing control information from any one of the processors to the control and any and all of the other processors via the bus, routing data destined for a single one of the other processors from the one processor to the switch bypassing the bus, and routing data destined for any two or more of the processors via the bus bypassing the switch.

In this manner it is no longer necessary that the switch unit simultaneously connect the first processor unit to all other processor units. Instead the data information to be transferred to all other processor units is sent by the sending processor unit to the connection bus from which all other processor units can receive data information. Thus, the complexity of the switch is reduced.

The described transfer of data information in accordance with the invention via the connection bus represents at the same time a circumvention of the switch unit provided for the transfer of data information. This circumvention of the switch unit can be advantageously used for testing, for fault finding, for initiation, or the like. By way of example a fault in the switch unit can easily be detected by such circumvention.

BRIEF DESCRIPTION OF THE FIGURE

The sole

DETAILED DESCRIPTION OF THE PREFERRED EMBODIMENT

Figure 1:
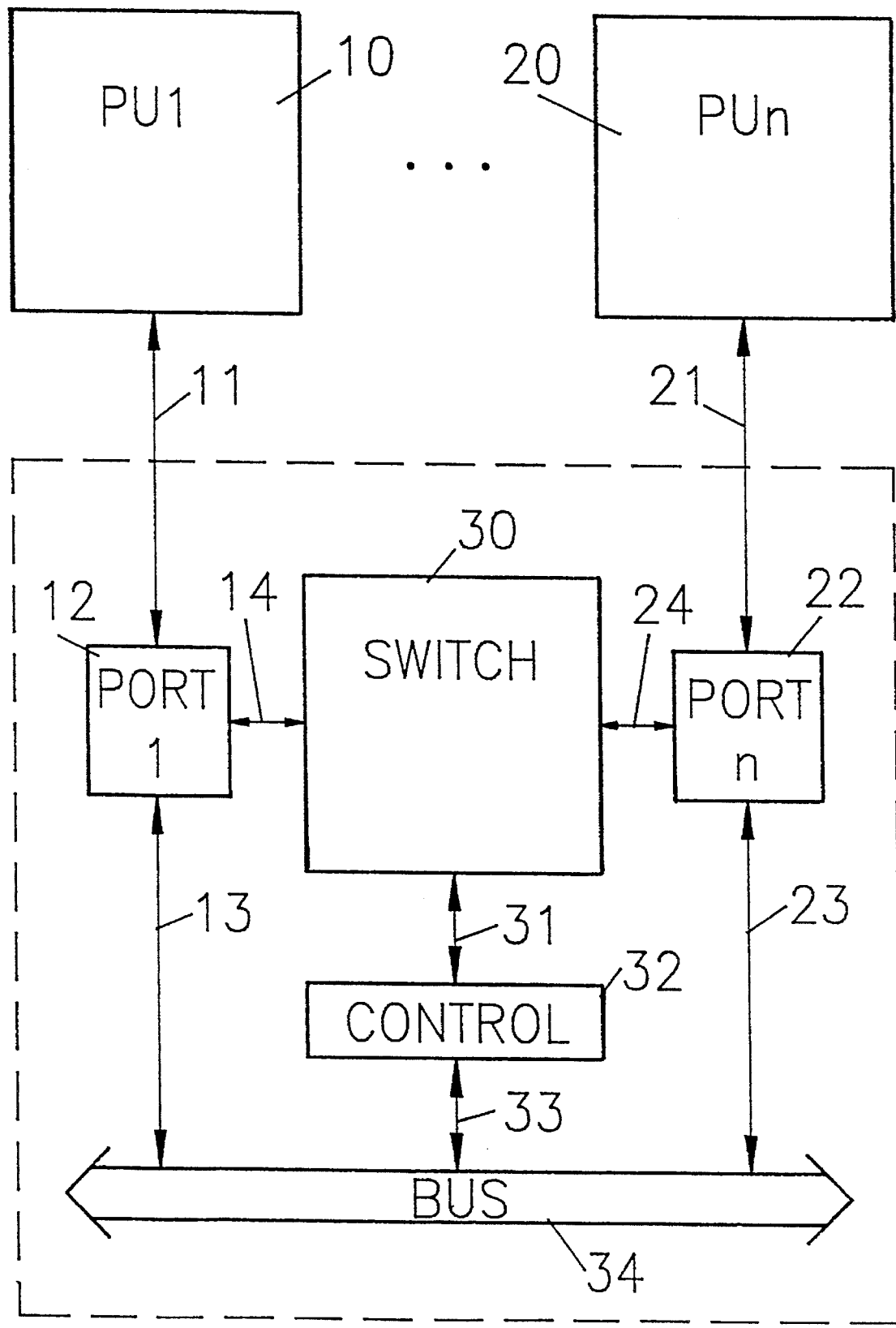
FIG. 1 shows a schematic block circuit diagram of a computer system having multiple processor units and an interprocessor coupler according to the present invention.

For the computer system of FIG. 1 are depicted a first and a second processor unit (PU1, PUn) 10, 20 which is intended to represent a plurality of such processor units. In general this is a multiprocessor computer system wherein the individual processor units once again may contain a plurality of processors.

The first processor unit 10 is connected to a gate circuit (PORT 1) 12 via connecting lines 11. Accordingly the second processor unit 20 is connected to a gate circuit (PORT n) 22 via connecting lines 21. Other processor units are connected in identical manner to corresponding gate circuits.

The gate circuit 12 is connected via other connecting lines 13, 14 to a connection bus (BUS) 34 and a switch unit (SWITCH) 30. Accordingly the gate circuit 22 is connected via connecting lines 23, 24 to the connection bus 34 and the switch unit 30.

Other gate circuits are connected in an identical manner.

A control unit (CONTROL) 32 is connected via a connecting line 31 to the switch unit 30 and via a connecting line 33 to the connection bus 34.

All gate circuits 12, 22, the switch unit 30, the control unit 32, the connection bus 34 and the respective connecting lines 11, 21, 14, 24, 13, 23, 31, 33 form in total an interprocessor communication coupler or interface circuit which is arranged in FIG. 1 within a broken line block and which serves to transfer information from one transmitting processor unit to one or more receiving processor units.

A transfer of information between two processor units, i.e. from the first processor unit 10 to the second processor unit 20 is effected in the following manner described below:

The first processor unit 10 sends control information to the gate circuit 12 with which the first processor unit 10 logs on to the second processor unit 20. The gate circuit 12 recognises the received signals as control information and passes on this control information to the connection bus 34 provided this is not otherwise in use. This control information passes from the connection bus 34 to the control unit 32 and via the gate circuit 22 to the second processor unit 20. Provided this second processor unit 20 is not in use the gate circuit 22 acting for the second processor unit 20 returns a reply in advance in the form of additional control information via the connection bus 34 to the gate circuit 12 with which it notifies its readiness to receive data information. This additional control information also arrives via the connection bus 34 to the control unit 32. By this time the control unit 32 has the message of the first processor unit 10 that this wants to send data information to the second processor unit 20 and the reply of the second processor unit 20 that this is ready for receiving data information. The control unit 32 then controls the switch unit 30 in such a manner that a connection between the gate circuit 12 via the connecting lines 14, the switch unit 30 and the connecting lines 24 to the gate circuit is effected. As soon as this connection is made in the switch unit 30 this is recognised by the first processor unit 10 by means of so-called level protocols. The processor unit 10 then starts to send the data information to be transferred. This data information arrives at the second processor unit 20 from the first processor unit 10 via the connecting lines 11, the gate circuit 12, the connecting lines 14, the switch unit 30, the connecting lines 24, the gate circuit 22 and the connecting lines 21. As soon as all data information is transferred the second processor unit 20 reports this in the form of control information to the gate circuit 22. The gate circuit 22 reports this completion via the connection bus 34 to the control unit 32, whereupon this activates the switch unit 30 for breaking the connections of processor unit 10 and processor unit 20.

The aforementioned transfer of data information is only effected between two processor units. The data information to be transferred in this case is fed as explained via the switch unit 30 and not via the connection bus 34.

If the data information has to be transferred now from a first processor unit 10 to all other processor units then this is effected in the following manner:

The first processor unit 10 sends control information to the gate circuit 12 informing it that it wants to transfer data information to all other processor units. For simplification this type of transfer is referred to in the following as broadcast transfer. The gate circuit 12 sends the said control information to the connection bus 34 so that all other gate circuits as well as the control unit 32 can read this control information. The other gate circuits as well as the control unit 32 recognise from the control information that it is a broadcast. This means that for the control unit 32 no measures are initiated regarding the switch unit 30. The other gate circuits test the state of the respective processor unit and transmit a reply in the form of additional control information to the connection bus 34 as soon as the respective processor unit is ready for receiving data information. The gate circuit 12 monitors the connection bus 34 in respect of replies of other gate circuits. As soon as replies are received from all gate circuits to the effect that the respective processor units are ready for receiving data information, the gate circuit 12 informs the processor unit 10 assigned to it of this fact. The processor unit 10 now transmits the data information to be transferred. Based on the capabilities of the gate circuits 22 . . . to recognise broadcast transfers with the aid of the control information present on the connection bus it is now possible to route the data flow from the gate circuit 12 to the connection bus to the other gate circuits 22 . . . and then to the respective other processor units 20 . . . . In contrast to the prior art, the data flow to these other processor units does not pass through switch unit 30 but instead passes through the connection bus 34. This means in the described case that the data information to be transferred passes from the first processor unit 10 via the gate circuit 12 to the connection bus 34 from which it can be received by all other processor units via the other gate circuits. Upon completion of the transfer of the data information the first processor unit 10 signals this to the gate circuit 12 whereupon this sends appropriate control information to the connection bus 34 with the aid of which the other gate circuits can recognise that the broadcast transfer is completed.

In the above the transfer of data information is effected from a sending processor unit to all other connected processor units. The transfer of data information is not made via the switch unit 30 but via the connection bus 34. In a broadcast transfer of this type control information is transferred as well as data information via the connection bus 34.

It is now possible to use the described transfer of data information via the connection bus 34 for other purposes. This is because this transfer of data information via the connection bus 34 ultimately represents a circumvention of the switch unit 30. It is therefore possible for testing purposes as well as for the purposes of fault finding to circumvent the switch unit 30 in this manner and thus test the switch unit 30. If the switch unit 30 has defective functions it is possible to determine and if required localise such defective functions of the switch unit 30 by making a comparison of the transferred data information on the one hand via the switch unit 30 and on the other hand by circumvention of the switch unit 30, via the connection bus 34. In doing so of course a broadcast transfer is not necessary, merely a transfer of data information between two processor units.

We claim:

1. A multiprocessor computer system comprising:

a bus;

at least three processors coupled to said bus;

a switch coupled to all of said processors to selectively interconnect any two of said processors at a time;

control means, coupled between said switch and said bus and responsive to control information requesting communication between two processors, for controlling said switch to interconnect said two processors;

routing means for routing control information from any one of said processors to said control means and any and all of the other processors via said bus; thereafter, routing data destined for a single one of said other processors from said one processor to said switch bypassing said bus, and routing data destined for any two or more of said processors via said bus bypassing said switch;

wherein the routing means comprises a multiplicity of gate circuits, one for each processor unit, each gate circuit being connected to the respective processor unit and the switch and the bus; and wherein each of said gate circuits includes means, responsive to control information which request communication to the respective processor, for determining if said respective processor is ready to communicate and responding to the gate circuit of the requesting processor via said bus with an indication whether said respective processor is ready to communicate.

2. A computer system as set forth in claim 1 further comprising means for routing data from one of said processors to a single other processor via said bus bypassing said switch during a test mode.

3. A computer system as set forth in claim 1 wherein said control means avoids activation of said switch when said control information indicates that communication is requested with all of said processors.

4. A computer system as set forth in claim 1 wherein said requesting processor sends the data to all other processors after all said other processors have responded that they are ready to communicate.

* * * * *